(12) United States Patent
Chen

(10) Patent No.: US 7,956,630 B1
(45) Date of Patent: Jun. 7, 2011

(54) REAL-TIME EFFECTIVE-WAVELENGTH ERROR CORRECTION FOR HDVSI

(75) Inventor: Dong Chen, Tucson, AZ (US)

(73) Assignee: Veeco Instruments, Inc., Tucson, AZ (US)

( * ) Notice: Subject to any disclaimer, the term of this patent is extended or adjusted under 35 U.S.C. 154(b) by 0 days.

(21) Appl. No.: 12/766,744

(22) Filed: Apr. 23, 2010

Related U.S. Application Data

(63) Continuation-in-part of application No. 12/082,846, filed on Apr. 15, 2008.

(51) Int. Cl.
*G01R 31/00* (2006.01)
(52) U.S. Cl. .................... 324/756.01; 356/516
(58) Field of Classification Search ........................ None
See application file for complete search history.

(56) References Cited

U.S. PATENT DOCUMENTS

| | | | | |
|---|---|---|---|---|
| 5,471,303 A | * | 11/1995 | Ai et al. | 356/497 |
| 5,633,715 A | * | 5/1997 | Ai et al. | 356/497 |
| 6,987,570 B1 | * | 1/2006 | Schmit et al. | 356/511 |

* cited by examiner

*Primary Examiner* — Ha Tran T Nguyen
*Assistant Examiner* — Arleen M Vazquez
(74) *Attorney, Agent, or Firm* — Antonio R. Durando

(57) ABSTRACT

An error correction for effective-wavelength variations is implemented by adjusting the filter parameters of the quadrature demodulation algorithm of a high definition vertical scanning process using a phase step that accounts for phase-step changes associated with variations in the effective wavelength irradiating the sample when the surface is curved. The nominal phase step is replaced in the filter with an actual phase step size that includes a phase parameter generated for each pixel by calibration or modeling of a specific type of surface. This substitution eliminates all errors produced by surface-dependent variations in the effective wavelength of the irradiating light.

17 Claims, 3 Drawing Sheets

(1)

REAL-TIME EFFECTIVE-WAVELENGTH ERROR CORRECTION FOR HDVSI

RELATED APPLICATIONS

This is a continuation-in-part application of U.S. application Ser. No. 12/082,846, filed Apr. 15, 2008.

BACKGROUND OF THE INVENTION

1. Field of the Invention

This invention relates in general to vertical-scanning interferometry (VSI) for surface characterization. In particular, it relates to an error-correction method for the high-definition vertical-scan interferometric (HDVSI) procedure described in Ser. No. 11/473,447, herein incorporated by reference.

2. Description of the Related Art

The well known techniques generally classified as phase-shifting interferometry (PSI) and vertical scanning interferometry (VSI) make it possible to measure the profile of most samples. However, they do not allow low-noise measurement of samples that combine smooth surfaces with large profile gradients and discontinuities. Measuring the profile of such samples requires the large scanning range of VSI (with vertical resolution in the order of $1/100$ of a wavelength and scanning range in the order of millimeters), while characterizing a smooth surface texture requires the vertical resolution normally afforded by PSI (in the order of $1/1000$ of a wavelength or less).

This problem has been addressed by the development of enhanced VSI algorithms (named EVSI in the art) that combine both PSI and VSI. In particular, Ser. No. 11/473,447 disclosed a new approach (named HDVSI, from high-definition VSI) based on performing a coarse calculation of surface profile with a conventional VSI method such as center of mass (COM), quadrature center of mass (QCOM), or zero crossing detection (ZCD), and concurrently performing a phase calculation carried out using the same irradiance frame data acquired for VSI. However, the phase calculation does not utilize the conventional n-frame phase shifting approach of the prior art. Instead, it utilizes a quadrature-demodulation (QD) algorithm applied to the irradiance data contained in the VSI correlogram.

As a result of this concurrent procedure, the phase calculation is independent of the position of any particular interferometric fringe and, therefore, it is more accurate and its results are more certain than those produced by the combined VSI/PSI methods of the prior art. Once both calculations are accomplished, the phase data are incorporated into the coarse profile data through a unique "unwrapping" method that yields a final surface map with sub-nanometer resolution within a large z-height range.

The HDVSI algorithm decouples the calculation of phase from the calculation of fringe-intensity peak. This results from the fact that QD manipulation of the correlogram data does not require a prior determination of the position of the coherence intensity peak. Therefore, the calculated phase map of the surface does not inherit the errors produced by the calculation of the coarse map. Such errors are removed from the coarse map, prior to combining it with the phase map, by consistently rounding all VSI measurements to an integer multiple of $2\pi$. In other words, the VSI coarse map is rounded to an integer multiple of $\lambda/2$. (Typically, the accuracy of a VSI coarse map is much better than $\lambda/2$.) As a result, the VSI errors are completely removed from the VSI coarse map through the rounding process, an achievement that is not possible with prior-art approaches. Thus, the HDVSI algorithm allows profiling to sub-nanometer accuracy with conventional equipment, the only necessary changes being in the computational components required to round the VSI data, to implement the QD algorithm, and to combine the phase data with the corrected VSI data in real time, as data are acquired during the scan.

Ideally, the scanner steps and the effective wavelength of the light source are constant and can be determined through precise calibration procedures. However, in reality the scanner position suffers from system errors, such as scanner nonlinearity and random deviations due to mechanical vibrations. Similarly, the effective wavelength of the irradiance produced by light source changes with the slope of the sample surface and also as a result of scanner nonlinearities. Therefore, the scanner sampling step and the effective wavelength are not constant and cause errors that distort the measured sample-surface profile.

A techniques for real-time correction of scanner-nonlinearities is described in a separate disclosure. The present invention is directed at a novel approach for the correction of errors caused by changes in the system's effective wavelength.

BRIEF SUMMARY OF THE INVENTION

The invention is based on combining the HDVSI procedure disclosed in Ser. No. 11/473,447 with a different quadrature-demodulation parameter found suppress phase errors due to effective-wavelength variations in the light irradiating curved sample surfaces. In HDVSI, the fringe phase and the peak of the coherent envelope of the correlogram are calculated independently and in parallel. The fringe phase is calculated using a quadrature demodulation technique wherein the nominal scanner step size and the effective wavelength are filter parameters.

According to the present invention, the error correction for effective-wavelength variations is implemented by adjusting the filter parameters of the quadrature demodulation algorithm using a phase step that accounts for phase-step changes associated with variations in the effective wavelength irradiating the sample when the surface is curved. The nominal phase step is replaced in the filter with an actual phase step size that includes a phase parameter generated for each pixel by calibration or modeling of a specific type of surface. As detailed below, this substitution eliminates all errors produced by surface-dependent variations in the effective wavelength of the irradiating light.

Various other advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment, and particularly pointed out in the claims. However, such drawings and description disclose but a few of the various ways in which the invention may be practiced.

DETAILED DESCRIPTION OF THE INVENTION

Figure 1:
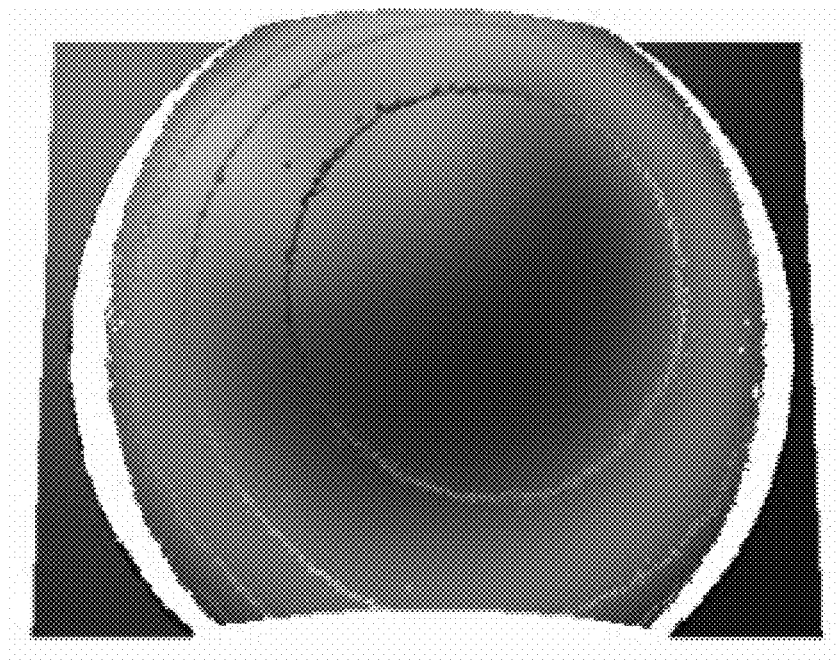
FIG. 1 is an illustration of the typical fringe noise produced by variations in the effective wavelength of an interferometric profiler when an HDVSI algorithm is used to measure a spherical sample surface.

The heart of the invention lies in the use of a demodulation parameter that accounts for phase errors caused by variations in the effective wavelength of light in the calculation of phase in the HDVSI algorithm described in Ser. No. 11/473,447. In particular, the phase change produced at each pixel by the effective-wavelength variation is determined and added to the nominal phase step used as a parameter in the demodulation algorithm. This substitution has been found to substantially correct the phase errors introduced by wavelength variations during the data-acquisition scan of the object.

The invention for convenience is described throughout in terms of VSI (i.e., the process of determining the coherence peak of an interferogram produced by a mechanical scan), but the term is intended to refer as well and include any coherence-peak sensing method that may be applicable to the procedure. Therefore, the broader notion of producing a coarse map of the sample surface by finding the coherence peak of interference fringes, however produced, is intended to be part of and covered by this invention. Thus, the invention is intended to include any method that produces interference fringes by changing the optical path difference between a test and a reference beam, such as, without limitation, mechanical scanning and polarization shifting methods.

An analysis of the error produced by variations in the effective wavelength of the irradiance illuminating the sample shows that, when constant filter parameters ($k_0$ and $\Delta\Phi_0$, defined below) are used and when wavelength-variation errors ($\tau_2$) are present, the phase obtained from the HDVSI demodulation filter is a combination of the true sample phase ($\Phi$) and a phase error ($\delta_\Phi$) related to the wavelength-variation error. In particular, as the VSI scan is implemented through a plurality of scanning steps ($\Delta\Phi$ or $\Delta z$, with reference to phase or distance, respectively) of predetermined nominal size (referred to herein interchangeably as nominal scan steps or phase steps), each detector pixel produces a signal with an amplitude that passes through and drops off very rapidly from its maximum value [$I_{max}$, corresponding to zero optical path difference (OPD)]. The interferometric signal can be expressed as $$I(n) = G(z_n - z_0)\cos(2nk_0\Delta z - \Phi) \tag{1}$$

where $G(z_n - z_0)$ is the Gaussian envelope of the correlogram (i.e., the amplitude of irradiance at each scanner position); $z_0$ and $z_n$ are the positions of the scanning objective at zero OPD and at the $n^{th}$ scanning step, respectively; $k_0$ is the wave number (i.e., $k_0 = 2\pi/\lambda_0$, $\lambda_0$ being the nominal effective wavelength of the illumination); and $\Delta z$, and $\Phi$ are the $n^{th}$ scan step and the phase of the correlogram, respectively.

As taught in Ser. No. 11/473,447, the interferometric signals $I(n)$ are manipulated with the HDVSI algorithm to produce a low-noise sub-nanometer resolution surface map. The HDVSI algorithm comprises several steps. After undergoing pre-processing filtration, if needed, the input to the algorithm (i.e., the interferometric irradiance signals produced by the VSI scan) is processed simultaneously in two ways that allow for the independent calculation of a coarse height $z_0$ of each surface point and of the phase $\Phi$ of the correlogram corresponding to that point. In the aggregate, the values of $z_0$ and $\Phi$ for all surface points imaged onto the light detector yield a coarse surface map, $z_{VSI}(x,y)$, and a high-definition phase map, $\Phi(x,y)$, of the test surface, respectively. As one skilled in the art would readily understand, the phase map $\Phi(x,y)$ can be equivalently expressed as a fine surface (or height) map, $z_{HD}(x,y)$, because the phase difference between two surface points is directly proportional to the difference in their heights. Therefore, for the purposes of this disclosure, the maps $\Phi(x,y)$ and $z_{HD}(x,y)$ and the corresponding terms "phase map," "surface map," "height map" and "map" may be used interchangeably. As a separate step of the HDVSI algorithm, the two maps are judiciously combined to generate the final high-definition surface map, $z_{HDVSI}(x,y)$.

The phase $\Phi$ of the correlogram is determined by applying a quadrature-demodulation approach. The signal $I(n)$ is passed through a QD filter that performs several operations. First, the irradiance signal is differentiated to eliminate the DC component in the original correlogram. Then, it is split into "in-phase" and "quadrature" signal components, J and Q, respectively, wherein $$Q_n = G(z_n - z_0)\cos(n2k\Delta z_n - \Phi)\sin(n2k_0\Delta z_0) \text{ and} \tag{2a}=$$

$$J_n = G(z_n - z_0)\cos(n2k\Delta z_n - \Phi)\cos(n2k_0\Delta z_0) \tag{2b}$$

where $k = 2\pi/\lambda$, $\lambda$ being the actual effective wavelength of the irradiance; $\Delta z_n$ is the actual size of the $n^{th}$ scan step; and $\Delta z_0$ is the parameter of the filter, chosen to match the nominal step size of the scan [typically equal to $m\lambda_0/8$, $m = 0, 1, 2 \ldots$].

At each pixel x,y of the sample surface, the deviations of the wavelength from the nominal effective value $\lambda_0$ may be represented by a generalized wavelength error $\tau(x,y)$ as follows, $$\lambda(x,y) = \lambda_0 + \tau(x,y) \tag{3}$$

Assuming an actual scan step equal to the nominal scan step of size $\lambda_0/8$ (i.e., 90°) and substituting for $\Delta z_n$, $\Delta z_0$ and k, Equations 2a, 2b, and 3 yield the following:

$$Q_n = G(n)\cos\left(n\frac{4\pi}{\lambda}\frac{\lambda_0}{8} - \Phi\right)\sin\left(n\frac{\pi}{2}\right) \tag{4a}$$
$$= G(n)\cos\left(n\frac{\pi}{2}\frac{\lambda_0}{\lambda_0 - \tau_{xy}} - \Phi\right)\sin\left(n\frac{\pi}{2}\right), \text{ and}$$

$$J_n = G(n)\cos\left(n\frac{4\pi}{\lambda}\frac{\lambda_0}{8} - \Phi\right)\cos\left(n\frac{\pi}{2}\right) \tag{4b}$$
$$= G(n)\cos\left(n\frac{\pi}{2}\frac{\lambda_0}{\lambda_0 - \tau_{xy}} - \Phi\right)\cos\left(n\frac{\pi}{2}\right).$$

When $\tau_{xy}/\lambda_0$ is much smaller than 1, $$Q_n = G(n)\cos\left(n\frac{\pi}{2}(1 + \delta_{xy}) - \Phi\right)\sin\left(n\frac{\pi}{2}\right) \text{ and} \tag{5a}$$

Defining $\delta_{xy}$ as $\tau_{xy}/\lambda_0$, the phase error due to effective-wavelength variations, Equations 4a and 4b may be written as $$Q_n = G(n)\cos\left(n\frac{\pi}{2}(1 + \delta_{xy}) - \Phi\right)\sin\left(n\frac{\pi}{2}\right) \text{ and} \tag{5a}$$

$$J_n = G(n)\cos\left(n\frac{\pi}{2}(1 + \delta_{xy}) - \Phi\right)\cos\left(n\frac{\pi}{2}\right). \tag{5b}$$

The quadrature demodulation procedure involves calculating the ratio $$\left(\frac{\sum_{n=1}^{N} Q_n}{\sum_{n=1}^{N} J_n}\right). \quad (6)$$

Accordingly, from Equation 5a, $$\sum_{n=1}^{N} Q_n = \sum_{n=1}^{N} G(n)\cos\left(n\frac{\pi}{2}(1+\delta_{xy}) - \Phi\right)\sin\left(n\frac{\pi}{2}\right). \quad (7a)$$

Equation 2b similarly yields:

$$\sum_{n=1}^{N} J_n = \sum_{n=1}^{N} G(n)\cos\left(n\frac{\pi}{2}(1+\delta_{xy}) - \Phi\right)\sin\left(n\frac{\pi}{2}\right). \quad (7b)$$

Applying to Equation 7a the general trigonometric formulas $$\sin(a+b)=\sin(a)\cos(b)+\cos(a)\sin(b) \text{ and} \quad (8a)$$

$$\sin(a-b)=\sin(a)\cos(b)-\cos(a)\sin(b), \quad (8b)$$

which, combined, produce the relation $$\sin(a+b)-\sin(a-b)=2\cos(a)\sin(b), \quad (8c)$$

Equation 7a becomes $$2\sum_{n=1}^{N} Q_n = \sum_{n=1}^{N} G(n)\sin\left(n\pi + n\frac{\pi}{2}\delta_{xy} - \Phi\right) - \sum_{n=1}^{N} G(n)\sin\left(n\frac{\pi}{2}\delta_{xy} - \Phi\right) \quad (9)$$

The first summation term is approximately zero when N>>1; therefore, $$2\sum_{n=1}^{N} Q_n = -\sum_{n=1}^{N} G(n)\sin\left(n\frac{\pi}{2}\delta_{xy} - \Phi\right) \quad (10a)$$
$$= -\cos(\Phi)\sum_{n=1}^{N} G(n)\sin\left(n\frac{\pi}{2}\delta_{xy}\right) + \sin(\Phi)\sum_{n=1}^{N} G(n)\cos\left(n\frac{\pi}{2}\delta_{xy}\right)$$

which follows from Equation 7b. Similarly, $$2\sum_{n=1}^{N} J_n = \cos(\Phi)\sum_{n=1}^{N} G(n)\cos\left(n\frac{\pi}{2}\delta_{xy}\right) + \sin(\Phi)\sum_{n=1}^{N} G(n)\sin\left(n\frac{\pi}{2}\delta_{xy}\right) \quad (10b)$$

Equations 10a and 10b may be further simplified by setting $$\sum_{n=1}^{N} G(n)\cos\left(n\frac{\pi}{2}\delta_{xy}\right) = a \text{ and} \quad (11a)$$

$$\sum_{n=1}^{N} G(n)\sin\left(n\frac{\pi}{2}\delta_{xy}\right) = b \quad (11b)$$

which yields $$2\sum_{n=1}^{N} Q_n = -\cos(\Phi)b + \sin(\Phi)a, \text{ and} \quad (12a)$$

$$2\sum_{n=1}^{N} J_n = \cos(\Phi)a + \sin(\Phi)b. \quad (12b)$$

Defining the phase error in terms of a new variable $\zeta_{xy}$ at each x,y pixel, such that $$\cos(\zeta_{xy}) = \frac{a}{\sqrt{a^2+b^2}} \text{ and} \quad (13a)$$

$$\sin(\zeta_{xy}) = \frac{b}{\sqrt{a^2+b^2}}, \quad (13b)$$

and further dividing Equations 12a and 12b by $\sqrt{a^2+b^2}$ and substituting Equations 13a and 13b produces the following relations in terms of the error $\zeta_{xy}$:

$$2\sum_{n=1}^{N} Q_n / \sqrt{a^2+b^2} = -\cos(\Phi)\sin(\zeta_{xy}) + \sin(\Phi)\sin(\zeta_{xy}) \quad (14a)$$
$$= \sin(\Phi - \zeta_{xy}), \text{ and}$$

$$2\sum_{n=1}^{N} J_n / \sqrt{a^2+b^2} = \cos(\Phi)\cos(\zeta_{xy}) + \sin(\Phi)\sin(\zeta_{xy}) \quad (14b)$$
$$= \cos(\Phi - \zeta_{xy}).$$

Finally, dividing Equations 14a and 14b yields $$\left(\frac{\sum_{n=1}^{N} Q_n}{\sum_{n=1}^{N} J_n}\right) = \frac{\sin(\Phi - \zeta_{xy})}{\cos(\Phi - \zeta_{xy})},$$

or $$\Phi - \zeta_{xy} = \tan^{-1}\left(\frac{\sum_{n=1}^{N} Q_n}{\sum_{n=1}^{N} J_n}\right). \quad (15)$$

Form Equation 15 it is apparent that, when constant filter parameters ($k_0$, $\Delta z_n$) are used and wavelength-related errors $\tau_{xy}$ are present during the scan, the phase obtained from the demodulation filter is the combination of the true sample phase $\Phi$ and a phase error $\zeta_{xy}$ related to the wavelength-variation error.

Thus, in practice, when the effective wavelength changes ($\lambda = \lambda_0 - \tau$) across a sloped surface, it distorts the relative phase between surface pixels. If the distorted phases are converted to z heights using the nominal effective wavelength ($\lambda = \lambda_0$), a distorted z surface map is obtained in the form of $2\pi$ jump error, as illustrated in FIG. 1 for a spherical surface. According to the invention, if the demodulation filters $$\cos\left(n\frac{\pi}{2}\right)$$

and $$\sin\left(n\frac{\pi}{2}\right)$$

of Equations 7a and 7b above are replaced by $$\sin\left(n\frac{\pi}{2}(1+\delta_{xy})\right)$$

and $$\cos\left(n\frac{\pi}{2}(1+\delta_{xy})\right),$$

then the quadrature Equations 7a and 7b become:

$$\sum_{n=1}^{N} Q_n = \sum_{n=1}^{N} G(n)\cos\left(n\frac{\pi}{2}(1+\zeta_{xy})-\Phi\right)\sin\left(n\frac{\pi}{2}(1+\delta_{xy})\right), \quad \text{and} \quad (16a)$$

$$\sum_{n=1}^{N} J_n = \sum_{n=1}^{N} G(n)\cos\left(n\frac{\pi}{2}(1+\zeta_{xy})-\Phi\right)\cos\left(n\frac{\pi}{2}(1+\delta_{xy})\right). \quad (16b)$$

Applying again the trigonometric formula of Equation 8c to Equation 16a yields:

$$2\sum_{n=1}^{N} Q_n = \sum_{n=1}^{N} G(n)\sin(n\pi(1+\delta_{xy})-\Phi) + \sum_{n=1}^{N} G(n)\sin(\Phi) \quad (17)$$

The first summation term is approximately zero when $N \gg 1$; therefore, $$2\sum_{n=1}^{N} Q_n \approx \sum_{n=1}^{N} G(n)\sin(\Phi) \quad (18a)$$

which follows from Equation 7b. Similarly, $$2\sum_{n=1}^{N} J_n = \sum_{n=1}^{N} G(n)\cos(n\pi(1+\delta_{xy})-\Phi) + \sum_{n=1}^{N} G(n)\cos(\Phi) \approx \quad (18b)$$

$$\sum_{n=1}^{N} G(n)\cos(\Phi).$$

From Equations 18a and 18b it follows that $$\tan^{-1}\left(\frac{\sum_{n=1}^{N} Q_n}{\sum_{n=1}^{N} J_n}\right) = \Phi. \quad (19)$$

Equation 19 shows that, if the quadrature demodulation filter of the HDVSI algorithm uses a parameter equal $$\left(n\frac{\pi}{2}(1+\delta_{xy})\right)$$

instead of the standard parameter $$\left(n\frac{\pi}{2}\right),$$

the phase error $\delta_{xy}$ produced by effective-wavelength variations is suppressed.

Thus, in order to correct errors caused by effective-wavelength deviation according to the invention, an effective-wavelength deviation map, $\tau_{xy}$, is needed (from which a corresponding phase-error map, $\delta_{xy}$, is advantageously derived). Such a map can be obtained empirically by a calibration process in which the spectral amplitude of the correlogram produced at each pixel is calculated using the quadrature-demodulation method. From the spectral amplitude, the effective wavelength, and thus the wavelength variation, or error, relative to the nominal wavelength at each pixel can be extracted. The extracted effective wavelength variation error can then used in the QD filter to correct the effective wavelength at each pixel.

An alternative approach to produce the $\delta_{xy}$ map is to use a parameterized model fitted empirically through calibration. For example, given the fact that variations in the effective wavelength are known to result mainly from curvatures in the sample surface, a model that reflects the slope of the surface can be used. For example, it can be assumed that $\delta_{xy}$ is equal to some function of the surface slope [i.e., $\delta_{xy} = F(\text{slope})$]. One example that proved to be effective in the error correction procedure of the invention for a spherical surface is the function $$\delta_{xy} = \alpha r^\beta, \quad (20)$$

where r is the distance between pixel (x,y) and a center pixel ($x_0, y_0$). This center pixel ($x_0, y_0$) is usually a surface location where the surface slope equal to zero. Accordingly, $$r = [(x-x_0)^2 + (y-y_0)^2]^{1/2}. \quad (21)$$

The coefficient $\alpha$ and the exponent $\beta$ are empirical parameters that can be determined through some kind of calibration process. For example, for a given spherical surface shape, the α and β parameters can be determined by finding the values that minimize the surface 2π error caused by the effective-wavelength variation.

Figure 2:
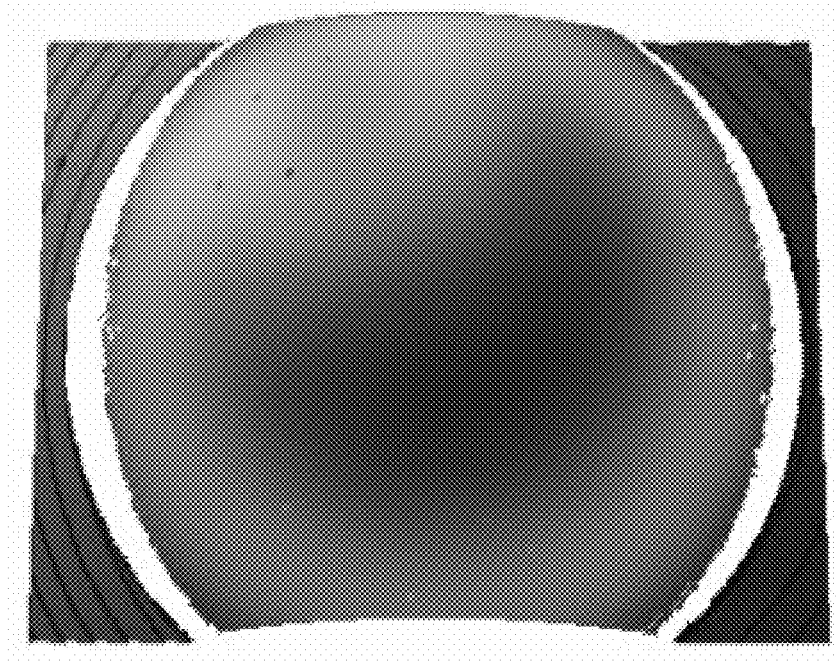
FIG. 2 shows the effect of the error-correction method of the invention when applied to the interferometric data of FIG. 1.
Figure 3:
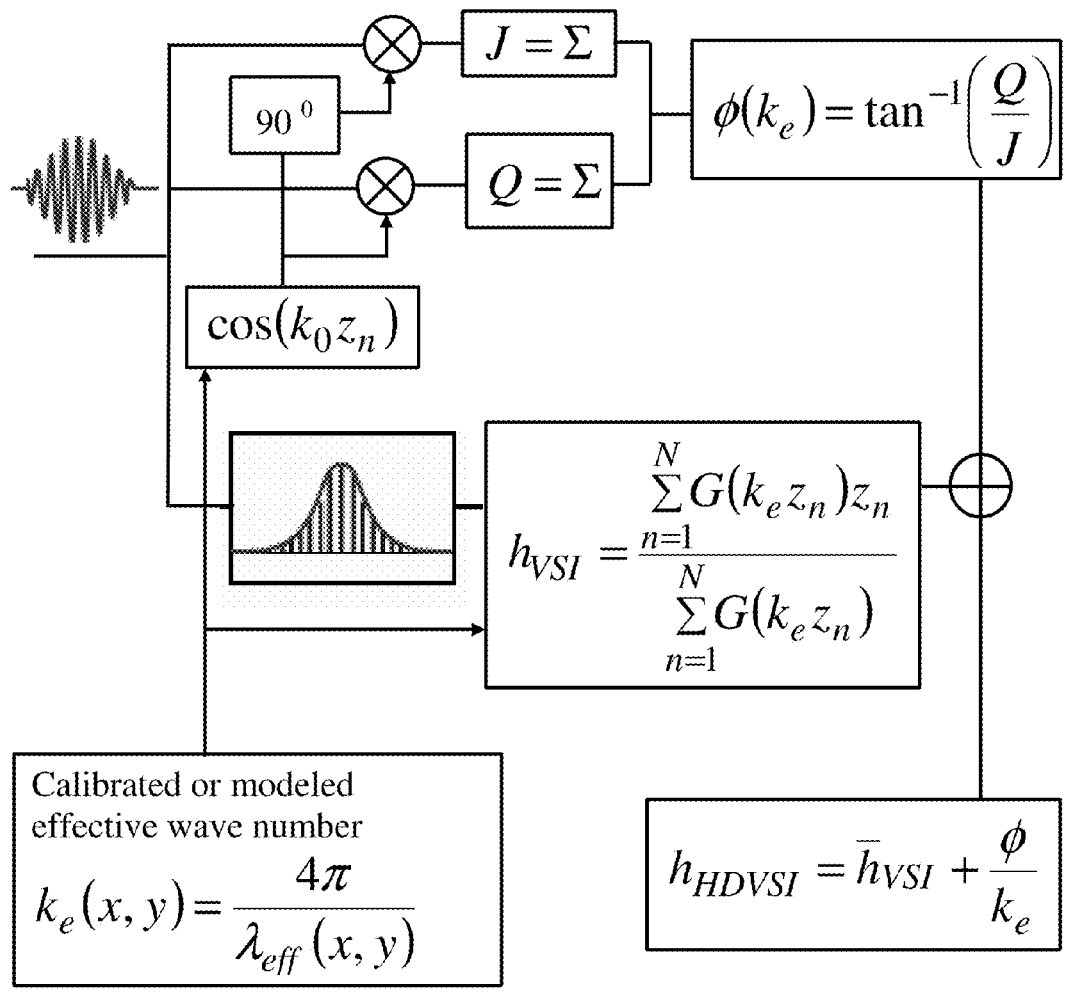
FIG. 3 is a diagram representing the application the filter parameter of the invention to the HDVSI quadrature-demodulation algorithm.

Once a $\delta_{xy}$ map is obtained, it is used according to the invention in the demodulation filter, as described above, to correct the image distortion caused by wavelength variations. FIG. 2 shows the corrected spherical surface image produced by applying correction procedure to the data of FIG. 1. The error correction algorithm is illustrated schematically in FIG. 3.

Note that the wavelength error correction of the invention may be applied to the phase-demodulation module concurrently with the scanner-nonlinearity error correction described in a separate disclosure for real-time HDVSI data processing.

Figure 4:
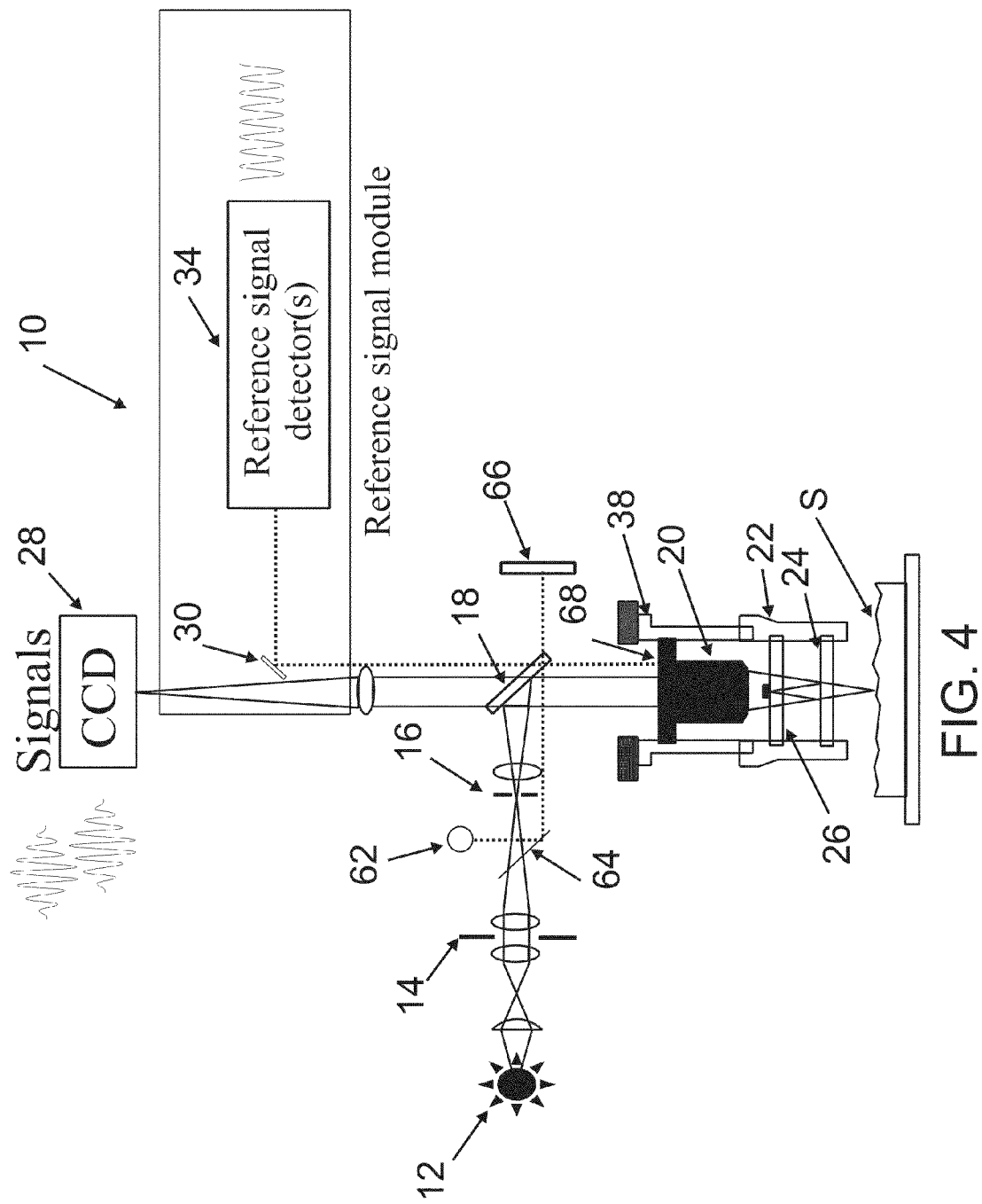
FIG. 4 is a schematic representation of a conventional interferometric profiler suitable to practice the invention.

The invention may be implemented with conventional interferometric equipment modified to perform the correction procedure described above. With reference to FIG. 4, wherein like parts are designated with the same numerals and symbols used throughout the drawings, such an interferometer 10 may comprise a light source 12 (such as white-light) directing a beam of light through an aperture 14 and field stop 16 toward a beam splitter 18 that reflects the light in the direction of a test surface S. The light reflected by the beam splitter 18 passes through a microscope objective 20 focused on the test surface S. The objective incorporates an interferometer 22, such as Mirau, comprising a beam splitter 24 and a reference mirror adapted for relative movement with respect to the test surface, so that two light beams are generated for producing interference fringes as a result of the optical path difference between the reference mirror and the test surface S. The beams reflected from the reference mirror 26 and the test surface S pass back up through the optics of the microscope objective 20 and through the beam splitter 18 to a solid-state detector array 28 in a camera in coaxial alignment with the objective 20.

Typically, the detector array 28 consists of individual CCD cells or other sensing apparatus adapted to produce a two-dimensional array of digitized intensity data corresponding to light signals received at each sensor cell as a result of the interference of the coherent light beams reflected from individual x-y coordinates or pixels in the surface S and from corresponding coordinates in the reference mirror 26. Appropriate electronic hardware (not shown) is provided to transmit the digitized intensity data generated by the detector to a microprocessor for processing. The microscope objective 20, as well as the interferometer typically incorporated within it, is adapted for vertical movement to focus the image of the test surface on the detector array 28.

According to the invention described in U.S. Pat. No. 6,987,570, an additional reference-signal interferometer may be built into the conventional measurement interferometer of the instrument and be dedicated to monitor OPD changes through a separate reference-signal channel. Such a reference signal is necessary to correct errors produced by scanner nonlinearities, as described in a separate disclosure. As illustrated in FIG. 4, a laser 62 may be used to provide enough light for a good-quality reference signal and a beamsplitter 64 is added in the optical measurement path to direct the laser beam toward the main splitter 18. A portion of the light is passed through to a reference mirror 66 for the reference signal, while the balance of the light is reflected toward a mirror or other reflective element 68 (such as a corner cube or a reflecting grating) placed on the moving part of the scanner 38 of the measurement interferometer.

While the present invention has been shown and described herein in what is believed to be the most practical and preferred embodiments, it is recognized that departures can be made therefrom within the scope of the invention. For example, neither the VSI-scan nor the phase parameter of the QD-filter used for calculation of the phase of the correlogram has to equal π/2, but it should be chosen to equal the value that is most appropriate for conducting the VSI scan. Also, the invention has been described in terms of a quadrature demodulation algorithm used to calculate phase in real time. However, it is recognized that quadrature demodulation is a particular case of wavelet filtering and that, as such, other wavelet filters may be used as well.

Therefore, the invention is not to be limited to the details disclosed herein but is to be accorded the full scope of the claims so as to embrace any and all equivalent processes and products.

The invention claimed is:

1. A method for producing a height map of a sample with correction of errors produced by variations in an effective wavelength illuminating the sample, the method comprising the following steps:
   producing a plurality of signals from a fringe pattern; and
   calculating the map of the sample by application of a quadrature-demodulation technique on said signals;
   wherein said quadrature-demodulation technique utilizes a filter with a phase parameter equal to an empirical value added to a nominal phase step used to produce said plurality of signals; and
   wherein said empirical value is a measure of a phase error produced by a variation of said effective wavelength illuminating the sample.

2. The method of claim 1, wherein said empirical value is obtained by a calibration process whereby a spectral amplitude of a correlogram produced at each pixel by said plurality of signals is calculated using a quadrature-demodulation method.

3. The method of claim 1, wherein said empirical value is obtained with a parameterized model fitted empirically to said sample.

4. The method of claim 3, wherein said sample has a surface corresponding substantially to a spherical section, and said parameterized model is represented by $$\delta_{xy} = \alpha r^\beta,$$

where r is a distance between a pixel x,y and a center pixel $x_0,y_0$ on said surface, and α and β are empirical parameters.

5. The method of claim 1, wherein said correction of errors is carried out in real time during said calculating step.

6. The method of claim 1, wherein said signals are interference signals.

7. A method for producing a height map of a sample with correction of errors produced by variations in an effective wavelength illuminating the sample, the method comprising the following steps:
   producing a plurality of signals from a fringe pattern;
   calculating a coarse map of the sample by application of a coherence-peak sensing technique on said signals;
   calculating a fine map of the sample by application of a quadrature-demodulation technique on said signals; and
   combining the coarse map and the fine map to produce a high-definition map of the sample;
   wherein said quadrature-demodulation technique utilizes a filter with a phase parameter equal to an empirical value added to a nominal phase step used to produce said plurality of signals; and wherein said empirical value is a measure of a phase error produced by a variation of said effective wavelength illuminating the sample.

8. The method of claim 7, wherein said empirical value is obtained by a calibration process whereby a spectral amplitude of a correlogram produced at each pixel by said plurality of signals is calculated using a quadrature-demodulation method.

9. The method of claim 7, wherein said empirical value is obtained with a parameterized model fitted empirically to said sample.

10. The method of claim 9, wherein said sample has a surface corresponding substantially to a spherical section, and said parameterized model is represented by $$\delta_{xy} = \alpha r^\beta,$$

where r is a distance between a pixel x,y and a center pixel $x_0, y_0$ on said surface, and $\alpha$ and $\beta$ are empirical parameters.

11. The method of claim 7, wherein said correction of errors is carried out in real time during said calculating step.

12. The method of claim 7, wherein said signals are interference signals.

13. Interferometric apparatus for producing a height map of a sample surface with correction of errors produced by variations in an effective wavelength illuminating the sample, the apparatus comprising:

means for producing a plurality of interference signals; and
means for calculating the map of the sample by application of a quadrature-demodulation technique on said interference signals;
wherein said quadrature-demodulation technique utilizes a filter with a phase parameter equal to an empirical value added to a nominal phase step used to produce said plurality of interference signals; and
wherein said empirical value is a measure of a phase error produced by a variation of said effective wavelength illuminating the sample.

14. The apparatus of claim 13, wherein said empirical value is obtained by a calibration process whereby a spectral amplitude of a correlogram produced at each pixel by said plurality of interference signals is calculated using a quadrature-demodulation method.

15. The apparatus of claim 13, wherein said empirical value is obtained with a parameterized model fitted empirically to said sample.

16. The apparatus of claim 15, wherein said sample has a surface corresponding substantially to a spherical section, and said parameterized model is represented by $$\delta_{xy} = \alpha r^\beta,$$

where r is a distance between a pixel x,y and a center pixel $x_0, y_0$ on said surface, and $\alpha$ and $\beta$ are empirical parameters.

17. The apparatus of claim 13, wherein said correction of errors is carried out in real time during said calculating step.

* * * * *